United States Patent [19]

Chleboun

[11] 4,107,660
[45] Aug. 15, 1978

[54] INTRUSION DETECTION SYSTEM

[75] Inventor: Thomas P. Chleboun, San Jose, Calif.

[73] Assignee: GTE Sylvania Incorporated, Mountain View, Calif.

[21] Appl. No.: 90,206

[22] Filed: Nov. 3, 1970

[51] Int. Cl.² .............................................. G08B 21/00
[52] U.S. Cl. .................................. 340/566; 340/7 R; 340/16 R
[58] Field of Search .................. 181/0.5 NP; 340/3 T, 340/5 D, 7 R, 258, 261, 16 R

[56] References Cited

U.S. PATENT DOCUMENTS

| | | | |
|---|---|---|---|
| 2,977,569 | 3/1961 | Harris | 340/261 UX |
| 3,109,165 | 10/1963 | Bagno | 181/0.5 NP |
| 3,394,275 | 7/1968 | Lippmann | 340/261 |
| 3,432,000 | 3/1969 | Ongicichowg | 340/10 |

Primary Examiner—Nelson Moskowitz
Attorney, Agent, or Firm—John F. Lawler

[57] ABSTRACT

A seismic and pressure wave sensor adapted to be buried in the earth to detect disturbances comprises a deformable tube containing an incompressible liquid in which a force-responsive transducer is immersed. The output of the transducer is an alternating signal having spectral components corresponding to both seismic (10–100 Hz) and pressure (< 1 Hz) type earth vibrations produced by human footsteps remote from and near to the buried sensor. In order to provide perimeter protection, an even-numbered plurality of such sensors are arranged in a row along a single curved or straight line and are electrically connected in parallel with the polarities of successive transducers reversed. A single processor connected to the outputs of such plurality of sensors has frequency-separated band-limited channels for isolating and detecting seismic and pressure signals, respectively, and for audibly, visually or otherwise indicating the pressure of either or both signals. An array of several multisensor units, each unit having a frequency coded processor, is connected to a remote alarm station which decodes the alarm signal to identify the sensor unit at which the intrusion occurred.

7 Claims, 11 Drawing Figures

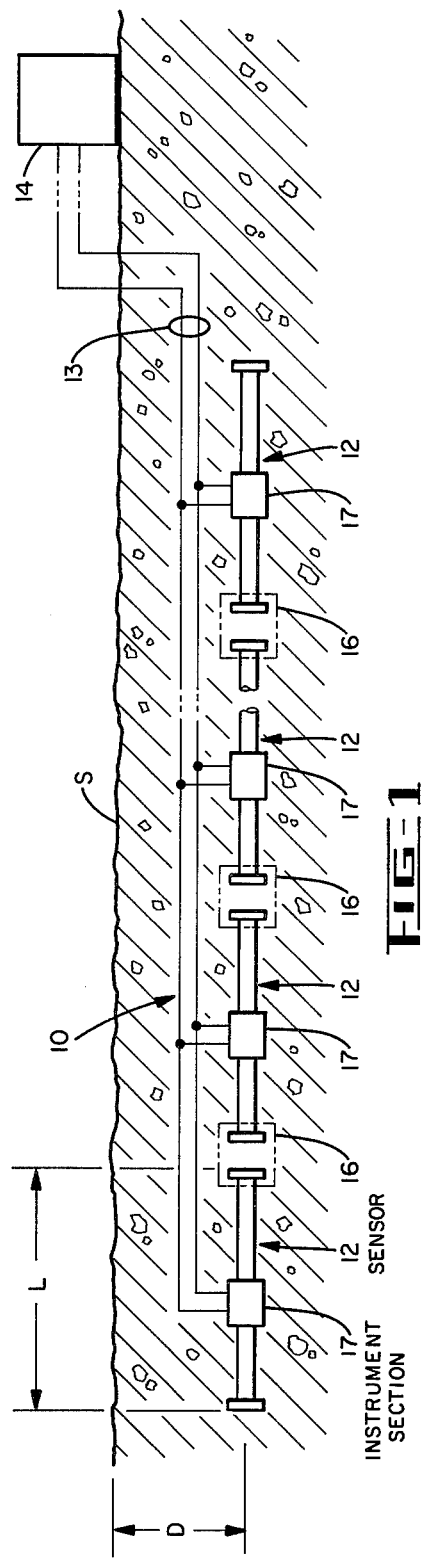
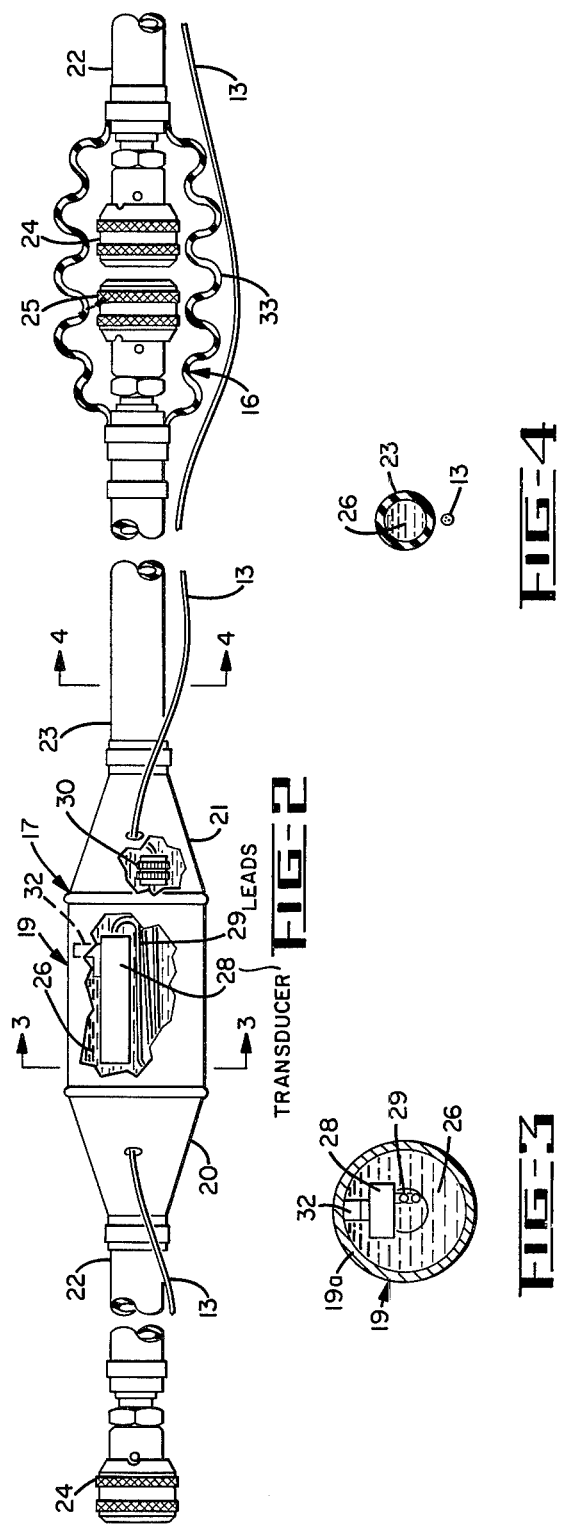

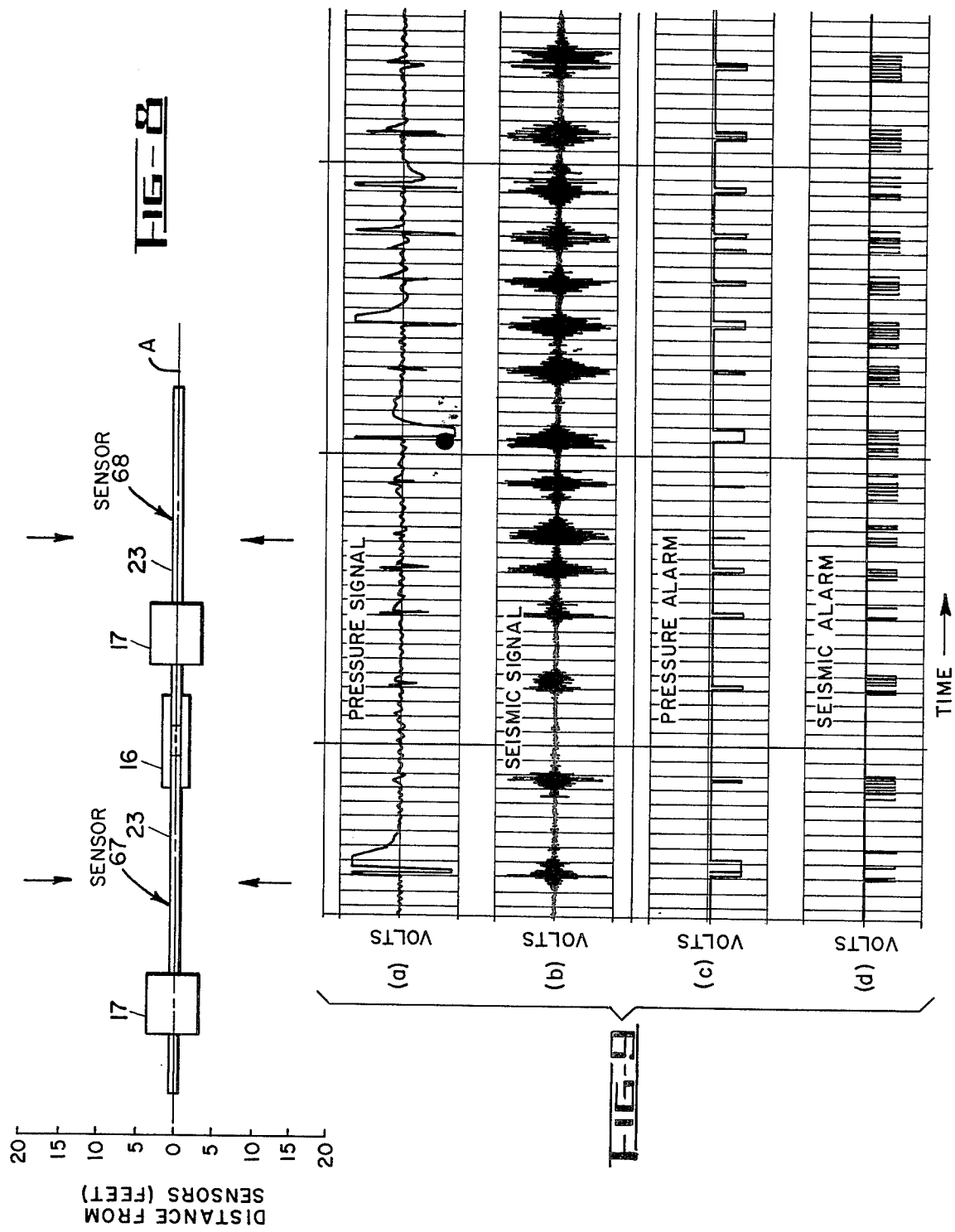

INTRUSION DETECTION SYSTEM

The invention herein described was made in the course of or under a contract or subcontract thereunder, with the United States Army.

BACKGROUND OF THE INVENTION

This invention relates to earth disturbance intrusion detection systems and more particularly to a buried detection system which senses compression waves in the earth produced by human footsteps.

Sensors for measuring and/or detecting vibrations in the earth, often called seismic sensors, generally employ one or more geophones as the transducer element. The geophone, which generally comprises a magnetized core in a helical coil, measures velocity or the rate of change of position of the core relative to the coil in response to earth movements. The earth wave thus is translated first into a mechanical velocity component (movement of core relative to coil) and secondly, into an electrical signal induced by the coil cutting the lines of flux. Such dual transducer action limits sensitivity of the geophone and its capability of measuring vibrations of minimum amplitude and frequency.

In order to enable earth disturbance sensors to be employed as intrusion detectors, they must be able to distinguish vibrations generated by true alarm sources, i.e., a man's footsteps, from false alarm sources, such as aircraft or earthquakes. In fact, the false alarm rating of an intrusion detection system is one of the most important factors involved in judging the effectiveness of the system. One false alarm discrimination technique used by the prior art is the deployment of two separate lines of sensors laterally and equally spaced apart so that broadly generated disturbances such as earthquakes affect both sensors alike whereas localized disturbances typified by an attempted point intrusion affect one sensor differently than the other. By comparing the signals from both sensors in appropriate processing circuits, false alarms are minimized. The disadvantages of such a system are the difficulty and cost of installing duplicate lines of sensors in the ground; these disadvantages are magnified when perimeters measured in miles or even thousands of feet are to be protected.

An object of this invention is the provision of a reliable perimeter type seismic intrusion detection system having a single line of sensors capable of being manufactured and installed at relatively low cost.

Another object is the provision of a seismic sensor having an extremely broad dynamic range, i.e., from less than 1 Hz to greater than 100 Hz.

Still another object is the provision of a seismic sensor that is extremely sensitive, i.e., capable of providing typical seismic compressional wave sensitivities of −90 dB referenced to 1 volt/$\mu$bar.

A further object is the provision of a seismic sensor having high detection performance and capable of sensing both seismic and pressure signals generated by the footsteps of a human traversing the sensor.

Still another object is the provision of a seismic sensor which is manufactured from standard commercially available parts which are relatively inexpensive, such as conventional garden hose.

A further object is the provision of a single line seismic detection system having a relatively small diameter and capable of rapid subterranean deployment by standard cable-laying equipment.

SUMMARY OF THE INVENTION

The seismic sensor according to this invention utilizes a force transducer such as a piezoelectric crystal in a small diameter rubber tube or hose filled with an incompressible liquid such as water to detect vibrations from less than 1 Hz to greater than 100 Hz. An even-numbered plurality of such sensors buried end-to-end with successive transducers having reversed polarities provides discrimination against mass disturbances while readily detecting localized vibrations caused by human footsteps. The exceptionally low frequency response of the system is achieved, inter alia, with a processor having an extremely high input impedance.

DESCRIPTION OF DRAWINGS

FIG. 1 is a schematic elevational view of a plurality of sensors embodying the invention disposed in an operative position underground;

FIG. 2 is an enlarged view of a portion of the sensors showing details of construction;

FIG. 3 is a transverse section taken on line 3—3 of FIG. 2;

FIG. 4 is a transverse section taken on lines 4—4 of FIG. 2;

FIG. 8 is a schematic plan view of a field test arrangement of seismic sensors embodying the invention;

FIG. 9 is an actual plot of seismic and pressure signals generated in the test field of FIG. 8 and derived from the circuit of FIG. 6 at points designated $a$ to $d$, inclusive;

DESCRIPTION OF PREFERRED EMBODIMENT

Figure 5:
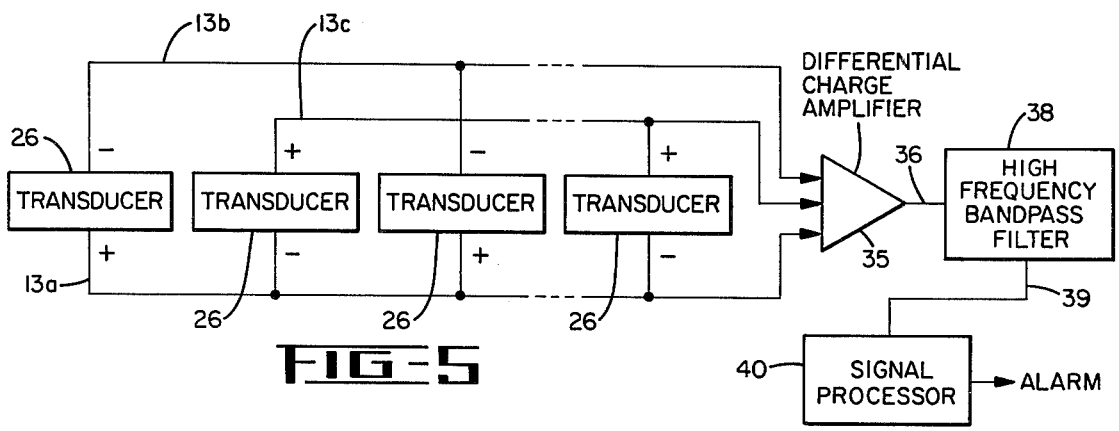
FIG. 5 is a simple schematic block diagram of the electrical circuits for a system which is responsive only to seismic signals in a predetermined frequency band.

Referring now to the drawings, a system embodying the invention is illustrated at 10 in FIG. 1 and comprises a plurality of elongated tubular sensors 12 disposed in end-to-end relation below the surface S of the earth and electrically connected by lines 13 to signal processing and alarm apparatus 14 which may be located remotely from the sensors as indicated. Alternatively, the signal processing part of apparatus 14 may be buried along with the sensors 12 as suggested by the embodiment illustrated in FIG. 10 and described hereinafter. Sensors 12 are physically separate from each other so that each sensor detects vibrations in the earth independently of the others. The outputs of the several sensors, however, are combined for intrusion detection purpose as explained below. For convenience in deploying the sensors along a single line in end-to-end relation, the ends of adjacent sensors are loosely connected together by an elastic coupling 16 indicated by broken line rectangles in FIG. 1. Each sensor has an instrument section 17 from which electrical signals corresponding to detected earth vibrations are derived and coupled to lines 13. By way of example, each sensor may have a length L of 25 feet and may be buried to a depth D of 12 inches below ground surface S.

The instrument section 17 of each sensor 12 consists of a hollow open ended preferably rigid housing 19, see FIGS. 2 and 3, and is connected at opposite ends by flexible conical extensions 20 and 21 to elongated resilient hollow rubber-like tubes or hoses 22 and 23, respectively. Opposite ends of the hoses are closed and sealed by end caps 24 and 25, respectively, so that the entire volume within the hoses, conical extensions and housing may be filled with an incompressible liquid 26 such as water.

In order to detect vibrations or waves within the earth around each sensor, a force-responsive transducer 28 is disposed within housing 19 and is electrically coupled by output leads 29 through connector 30 to lines 13 which may be taped to or otherwise secured to the exterior of hoses 22 and 23. Transducer 28 preferably is a piezoelectric type comprising a crystal such as quartz, Rochelle salt, or barium titinate which generates a voltage across its terminals in proportion to compressive forces transmitted to it through the liquid 26. A transducer of this type which has proven successful in practical embodiments of the invention is Model MP-16 miniature hydrophone manufactured by Geospace Corporation of Houston, Texas and rated at 30,000 pf and −90 dB referenced to 1 volt/$\mu$bar, and having dimensions of 1⅛ inches × 7/16 inch × 3 inches. Transducer 28 is secured to wall 19a of housing 19 by a mounting arm 32.

While water, preferably de-ionized, may be used as the liquid filler for each sensor 12 in moderate climates, an antifreeze liquid such as ethylene glycol or similar composition should be used if temperatures below 0° C are likely to exist. Hoses 22 and 23 may be conventional 1⅛ inches O.D. garden hose material having a wall thickness approximately ⅜ inch. The length L of each sensor is related to attenuation of compression waves in the filler liquid, the sensitivity of transducer 28, and the amplitude of the vibrations or waves sought to be detected in the earth. By way of example, a sensor having a length L of 25 feet and utilizing the aforementioned hydrophone and de-ionized water was built and tested with satisfactory results.

The mechanical coupling 16 between adjacent ends of each pair of sensors may take the form of a rubber-like sleeve 33 shaped in the form of a bellows. These couplings serve simply to serially connect the several sensors to facilitate rapid installation in the field.

An important and unique feature of each sensor 12 is its broad dynamic range which includes detecting vibrations having frequencies from less than 1 Hz to greater than 100 Hz. Each sensor is extremely sensitive to pressure waves in the earth surrounding it so that minimum pressures substantially at the rating of the transducer, i.e., −90 dB referenced to 1 volt/$\mu$bar, can be detected and translated into a useful electrical signal. It is believed that the high sensitivity and wide dynamic range of each sensor 12 is attributable not only to the transducer per se, but also to the extension of the force-responsive surface of the transducer over the length of the entire sensor by means of the confined incompressible liquid. Also, translation of earth vibrations directly into electrical signals in a single transducing action by the transducer is a further factor contributing to the sensitivity of the sensor. Such characteristics uniquely qualify this sensor as an absolute pressure wave detection mechanism for measuring earth disturbances irrespective of the source or cause. For example, sensor 12 is highly advantageous as a seismic sensor of such disturbances due to earthquakes, munitions and vehicular movement as well as human footsteps.

It has been determined that a human being walking at a normal pace generates vibrations in the earth in the frequency band of approximately 10–100 Hz. In view of the wide dynamic range of each sensor 12, it is possible to construct an intrusion detection system which is responsive only to the footsteps of a human walking at a normal pace. Such a system is illustrated in FIG. 5 in which four transducers 26 of sensor 12 are depicted for clarity of illustration. The polarities of successive transducers 26 in each sensor are reversed as shown with one set of terminals connected to a common lead 13a, and the remaining negative and positive terminals connected to leads 13b and 13c, respectively. The purpose of alternating the polarities of the transducers is to cancel the effects of broad earth disturbances resulting from earthquakes, aircraft, or like sources and thus discriminate against such pressure waves in favor of those caused by human footsteps.

Leads 13a, 13b and 13c are connected as inputs to a differential charge amplifier 35 which produces an output on line 36 whenever the outputs of one or more (but less than all) transducers 26 exceed the outputs of the remaining transducers in the sensor. Amplifier 35 is designed to be driven by a capacitive source, i.e., piezoelectric transducers 26, and has a high input impedance in order to pass signals having frequencies down to 0.01 to 0.05 Hz. In practice, amplifier 35 has a gain of approximately 1 and so an additional amplifier, not shown, preferably a charge amplifier, is provided to boost the total signal gain. Charge amplifiers are available commercially, for example, from Electra Scientific Corporation of Fullerton, California. A bandpass filter 38 having lower and upper frequency limits of 10 Hz and 100 Hz, respectively, is connected to output line 36 and passes signals on line 39 having frequencies which fall within those limits. A signal processor 40 connected to output line 39 compares these signals with appropriate threshold level and produces an alarm signal on line 41 when the threshold is exceeded. Processor 40 may contain other circuits for discrimination against spurious or false signals and, by way of example, may include a processor circuit of the type described in application Ser. No. 7571 filed Feb. 2, 1970 and assigned to the assignee of this invention.

Figure 6:
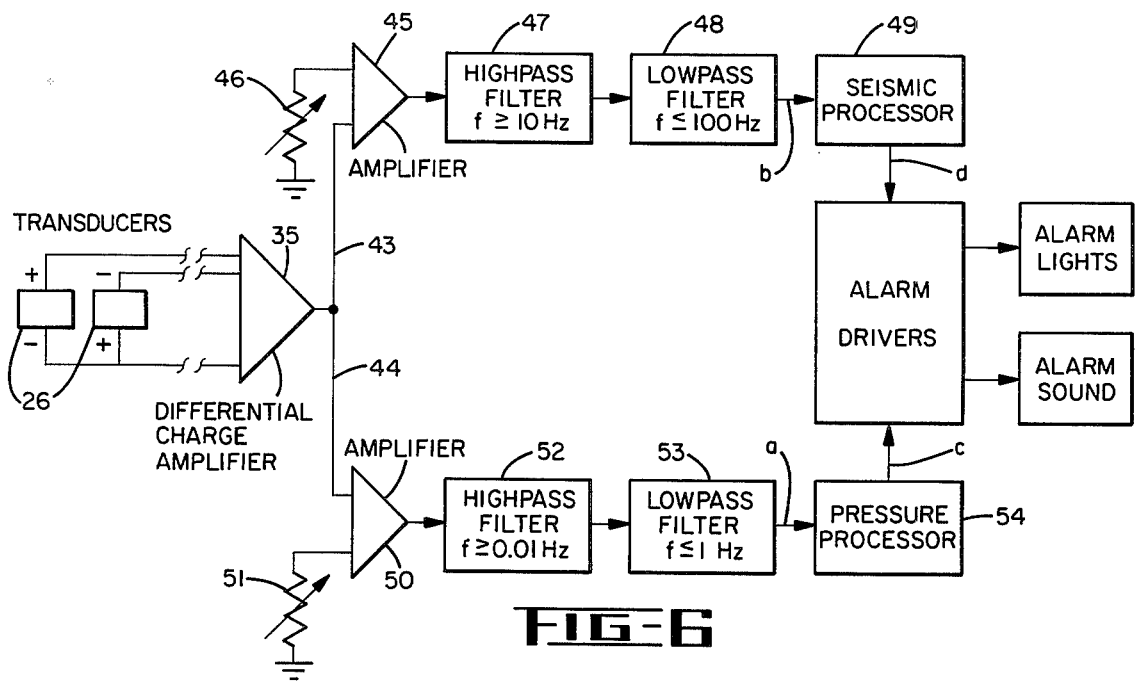
FIG. 6 is a block diagram of an intrusion detection system which is responsive both to seismic and pressure type signals in two different frequency bands, both signals being derived from the same set of sensors.

Because sensors 12 are also responsive to extremely low frequency vibrations, i.e., in the 0.01 to 1 Hz band, an additional unique discriminating characteristic inherent in these same sensors may be utilized to prevent intentional defeat of the system by an intruder. This advantage is realized in the system illustrated in FIG. 6 in which the sensor represented by transducers 26 and connected to differential charge amplifier 35 as described above produce an output which is divided and applied to lines 43 and 44 for simultaneous processing by high frequency and low frequency channels, respectively. The high frequency or seismic channel comprises an amplifier 45 with a gain control 46, a high pass filter 47 with a cutoff frequency of 10 hz, a low pass filter 48 with a cutoff frequency of 100 Hz, and a seismic signal processor 49 connected in series. The low frequency or pressure channel comprises an additional amplifier 50 having a gain control 51, a high pass filter 52 with a cutoff frequency of 0.01 Hz, a low pass filter 53 with a cutoff frequency of 1 Hz, and a pressure signal processor 54. In actual practice, filters 52 and 53 comprise one low pass filter with a 1 Hz cutoff, the differential amplifier 35 inherently providing the 0.01 Hz lower cutoff. The outputs of processors 49 and 54 are fed to appropriate alarm drivers 55 which may activate either alarm lights 56 or an alarm sound mechanism 58, or both, in response to signals from either processor. Of course, each channel may be connected to its own alarm, if desired. By providing a dual channel system of the type shown in FIG. 6, either the walking/running intruder who generates seismic signals or the slow moving intruder who produces pressure signals are readily detected and the capability of the system is enhanced to that extent.

Figure 7:
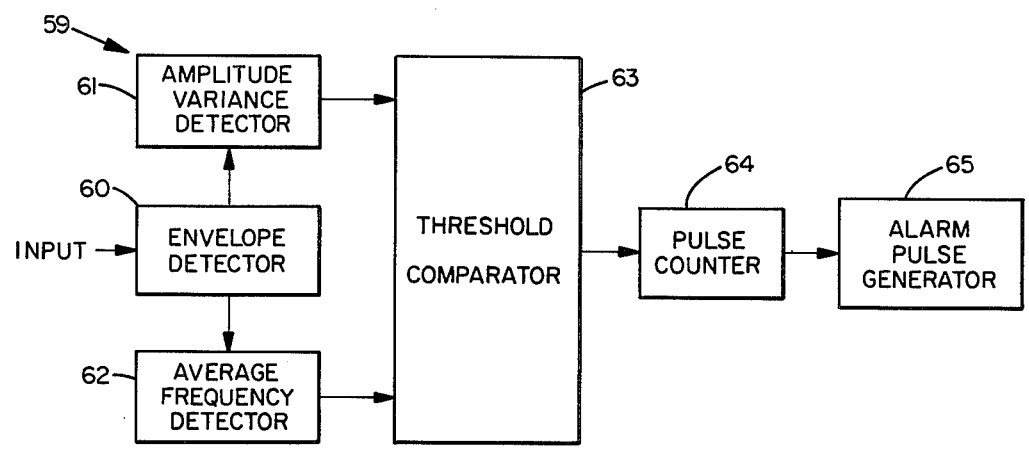
FIG. 7 is a detailed block diagram of a seismic signal processor useful in the practice of the invention.

Pressure processor 54 may, by way of example, consist of a full-wave rectifier and a noise-riding threshold circuit having an adjustable threshold control. Seismic processors 40 and 49 may comprise a circuit of the type described and claimed in application Ser. No. 94,405 filed December 2, 1970, assigned to the assignee of this invention and illustrated at 59 in FIG. 7 in block form.

Briefly, processor 59 consists of an envelope detector 60 to which the output of low pass filter 48 (or bandpass filter 38) is applied, and an amplitude variance detector 61 and an average frequency detector 62, both of the latter being fed by the output from envelope detector 60. The outputs of detectors 61 and 62 are compared in a threshold comparator 63 which triggers a pulse counter 64 each time the output of detector 61 exceeds that of detector 62. Counter 64 activates an alarm pulse generator 65 when the pulse count exceeds a predetermined number. The processor shown in FIG. 7 and described above does not, per se, constitute part of this invention but is an example of one type of processor that is useful in the practice of the invention.

By way of an example illustrating results obtained with a detection system embodying the invention, a pair 67 and 68 of sensors, see FIG. 8, were connected as described above and buried in a straight line along an axis A in a test field to a depth of about 12 inches. Distances on either side of the buried line were marked on the surface of the earth and tests were conducted with a man walking transversely of the line in the directions of the arrows in FIG. 8. The signal processing circuit shown in FIG. 6 was tapped at points $a$, $b$, $c$ and $d$ to provide outputs indicative of actual signals (points $a$ and $b$) and alarm signals (points $c$ and $d$) for the pressure and seismic channels, respectively. Outputs from these four taps were fed to and displayed on a strip chart recorder and plots of a walking intruder were made. The results are shown in FIG. 9, the letter opposite each plot corresponding to the respective tap point in FIG. 6. It will be noted that the detection range of the sensors is substantially greater for seismic vibrations than for pressure vibrations as indicated by the widths of the respective signals in FIG. 9($a$) and ($b$) and by the greater number of seismic alarms in FIG. 9($d$) as compared to pressure alarms in FIG. 9($c$). The range is also dependent on the gain settings for the channels. For a gain setting of 76 dB on control 51 in the pressure channel, footsteps in a path 4 to 5 feet wide over the sensors were detected and produced an alarm. For a gain setting of 58 dB on control 46 in the seismic channel, the detection path was 35 feet wide. With higher gain settings on the amplifiers, detection of seismic waves from footsteps as far as 100 feet or more from the sensor are achievable and similarly the range for footstep pressure waves may be increased.

A perimeter intrusion detection system utilizing the single line of sensors embodying the invention may be employed as an absolute detector of intrusions for perimeters that are sufficiently small to require no indication of the precise location of the penetration or intrusion. Such a protected area might be a square lot 100 meters on a side. In substantially larger areas to be protected such as multi-acre fields having thousands of feet or miles of a perimeter, knowledge of the point of intrusion is essential to the security of the area. A system embodying the invention and modified to provide point-of-intrusion information is illustrated in FIGS. 10 and 11.

Figure 10:
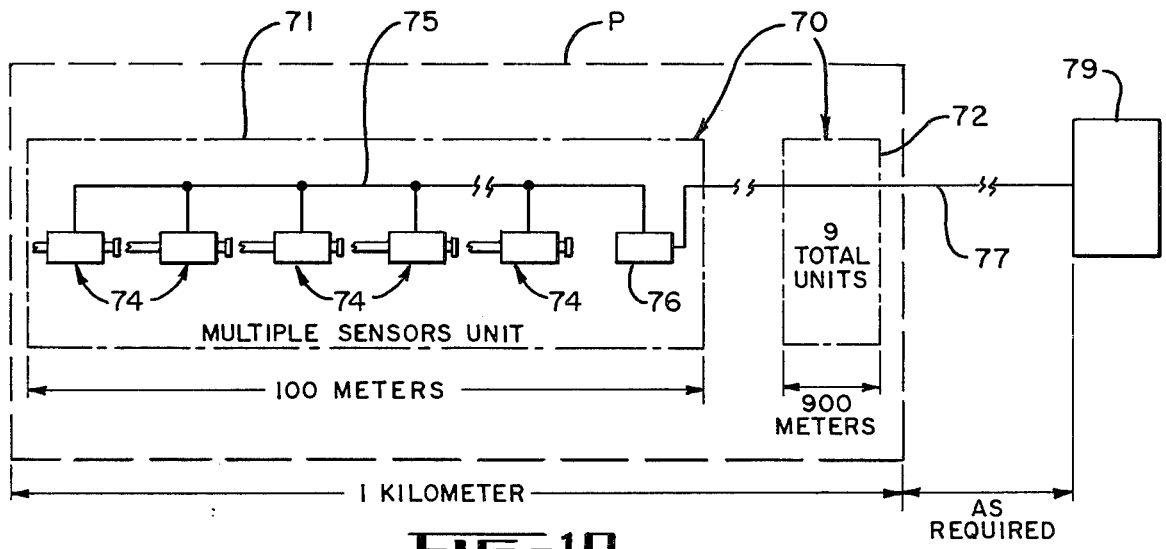
FIG. 10 is a schematic diagram of a typical deployment of multisensor systems in an array useful for protecting perimeters of substantial length.

As shown in FIG. 10, a parcel P having length of 1 kilometer is represented as being protected by a system 70 having ten 100-meter sensor units, one of which is indicated by the broken line rectangle 71. The other broken line rectangle 72 represents collectively the nine other 100-meter sensor units. Each sensor unit 71 comprises ten sensors 74, each 10 meters long and substantially identical in construction to sensors 12 described above. Each sensor 74 is connected in parallel by line 75 to a signal processing unit 76 which is buried adjacent to the end sensor. The output from processor 76 is connected by line 77 to a remote control station 79 which contains suitable alarm and recording apparatus to monitor the operation of the system. Processors 76 associated with the ten sensor units are connected in parallel with line 77.

Figure 11:
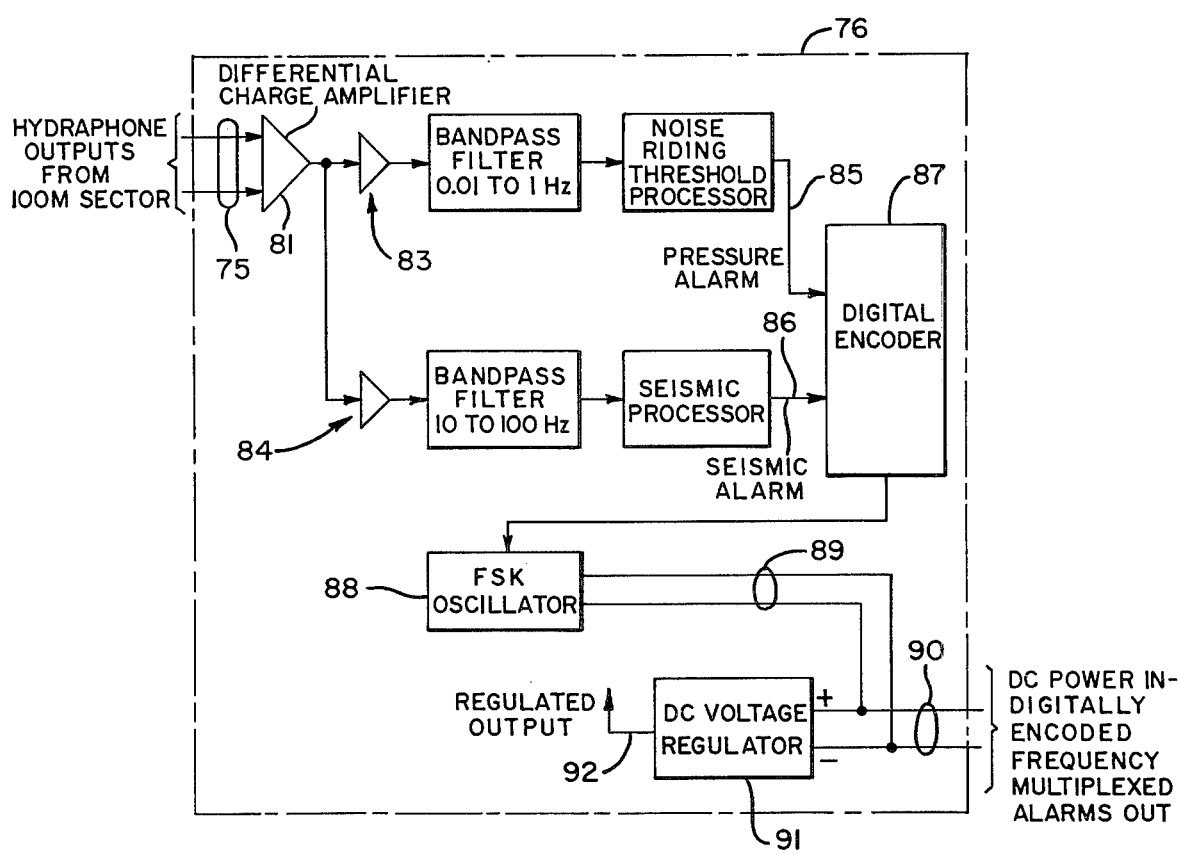
FIG. 11 is a block diagram of electronic circuitry associated with each multiple sensor unit shown in FIG. 10.

Each processor 76 comprises a differential charge amplifier 81, see FIG. 11, which receives its input from the transducers in the ten sensors 74 and which has an output connected in parallel to a pressure signal processing channel 83 and a seismic signal processing channel 84. These channels 83 and 84 are substantially identical to those described above with respect to FIG. 6 and accordingly details are omitted from this description. Alarm signal output lines 85 and 86 from channels 83 and 84, respectively, are connected to a digital encoder 87 which actuates a frequency shift key oscillator 88 to produce a signal having a frequency which identifies the particular 100-meter sensor unit 71. Different frequencies are generated by the coded oscillators in the several processors 76, each frequency corresponding to one 100-meter sensor unit 71, and frequency-multiplexed alarm signals are thus produced for transmission to station 79. More specifically, the output of oscillator 88 is connected by lines 89 to the DC power lines 90 which carry power from remote station 79 to a voltage regulator 91 in each processor 76. Thus power lines 90 serve a dual purpose of carrying power in and alarm signals out. The output of regulator 91 on lines 92 is a regulated power supply for the electronic circuits in the associated processor. Encoder 87 applies separate codes for the pressure and seismic alarms and appropriate decoding apparatus at the remote station identifies which type of signal is generated and from which sensor unit 71 it originates.

The efficiency of detection systems embodying the invention is dependent to a considerable degree on the homogeneity of the medium surrounding the sensors and the capability of that medium to transmit pressure waves. Deploying the sensors in the ground by trenching, burying and filling tends to detract from homogeneity of the soil and thus increases the attenuation of earth disturbance pressure waves transmitted to the sensors. Minimum disruption of the ground in burying the sensors therefore is desirable to enchance system operation. The sensors described above with relatively small diameter are particularly well adapted to be inserted in the ground by conventional high-speed electric cable laying equipment which not only permits rapid deployment but also ideally does so with minimum disturbance of ground homogeneity.

My invention also contemplates deployment of these sensors in artificial media such as concrete or the like for detection of intruder or other footsteps in certain perimeters around or in buildings or other structures. In such applications, the sensors are set permanently in the concrete, preferably at the time of construction of the building. Depending on the false alarm environment in such applications, use of balanced transducers as described above may be omitted and absolute pressure wave detection by one or more sensors may be employed.

Another factor contributing to the range sensitivity of the above-described system to compression waves in the ground is the depth to which the sensors are buried. Operationally, the optimum depth is a trade-off between attenuation of vertically directed pressure waves in proportion to the depth and an increase in sensitivity to obliquely directed seismic waves with an increase in depth. Generally deployment costs increase with depth. The hardness of the ground also has a bearing on selection of the optimum depth.

I claim:

1. A subterranean intrusion detection system comprising
   an even numbered group of elongated sensors disposed in a single line in end-to-end relation at substantially the same depth below the earth's surface, each sensor being mechanically coupled to the earth for receiving pressure waves therefrom and comprising
   a deformable hollow enclosure filled with an incompressible liquid,
   a pressure responsive transducer in said liquid capable of converting pressure waves in said liquid into a unidirectional voltage, said transducer having two outputs of opposite polarity,
   conductor means electrically connecting the outputs of said transducers in parallel with the polarities of the transducers of adjacent sensors reversed,
   comparison means connected to said conductor means for comparing the transducer outputs of one polarity with the transducer outputs of opposite polarity and producing a signal when said outputs differ,
   filter means connected to the output of said comparison means for receiving said signal from said comparison means, said filter means having passband characteristics whereby signals having frequencies within prescribed limits are transmitted and all others are blocked,
   and means responsive to the output of said filter means for indicating an intrusion.

2. The system according to claim 1 in which said filter means comprises at least two filters having frequency separated passbands.

3. The system according to claim 2 in which the passbands of said filters are respectively greater and less than 10 Hz.

4. The system according to claim 3 in which the passband of one filter is less than 1 Hz and the passband of the other is between 10 and 100 Hz.

5. The system according to claim 1 in which adjacent ends of adjacent sensors are spaced apart, an elastic sleeve mechanically coupling adjacent ends of adjacent sensors.

6. A subterranean intrusion detection system comprising
   a plurality of even numbered groups of elongated sensors disposed in a single line in end-to-end relation at substantially the same depth below the earth's surface, each sensor being mechanically coupled to the earth for receiving pressure waves therefrom and comprising
   a deformable hollow enclosure filled with an incompressible liquid,
   a pressure responsive transducer in said liquid capable of converting pressure waves in said liquid into a unidirectional voltage, said transducer having two outputs of opposite polarity,
   conductor means electrically connecting the outputs of said transducers in parallel with the polarities of the transducers of adjacent sensors reversed,
   comparison means connected to said conductor means for comparing the transducer outputs of one polarity with the transducer outputs of opposite polarity and producing a signal when said outputs differ,
   filter means connected to the output of said comparison means for receiving said signal from said comparison means, said filter means having passband characteristics whereby signals having frequencies within prescribed limits are transmitted and all others are blocked,
   means responsive to the output of said filter means for indicating an intrusion,
   means for differently coding the outputs of the filter means of each of said groups, and
   a station remote from said sensors,
   said station having decoding means for indicating the group from which the signal originated.

7. The system according to claim 6 with a source of DC electrical power at said remote station, power lines connecting said source to the comparison means and filter means of each of said groups, said coding means at said groups being frequency multiplexers connected to said power lines.

* * * * *